(12) United States Patent
Gore

(10) Patent No.: US 8,076,058 B2
(45) Date of Patent: Dec. 13, 2011

(54) COLOR FORMING COMPOSITIONS AND ASSOCIATED METHODS

(75) Inventor: Makarand P. Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1364 days.

(21) Appl. No.: 10/956,180

(22) Filed: Sep. 30, 2004

(65) Prior Publication Data

US 2006/0068315 A1 Mar. 30, 2006

(51) Int. Cl.
*G03C 1/73* (2006.01)
*B41M 5/28* (2006.01)

(52) U.S. Cl. .................................. 430/345; 503/200

(58) Field of Classification Search ........... 430/270.1, 430/905, 910, 292, 338, 343, 345; 503/218, 503/225, 200
See application file for complete search history.

(56) References Cited

U.S. PATENT DOCUMENTS

| | | | |
|---|---|---|---|
| 3,293,055 A | 12/1966 | Baum | |
| 3,320,067 A | 5/1967 | Taylor | |
| 3,820,995 A | 6/1974 | Mertens et al. | |
| 4,052,218 A | 10/1977 | Samat et al. | |
| 4,097,288 A * | 6/1978 | Lawton | 106/31.19 |
| 4,251,619 A * | 2/1981 | Kurita | 430/292 |
| 4,444,869 A * | 4/1984 | Chonan et al. | 430/325 |
| 4,753,867 A * | 6/1988 | Arakawa et al. | 430/345 |
| 4,845,021 A * | 7/1989 | Miyazaki et al. | 430/330 |
| 5,230,986 A * | 7/1993 | Neckers | 430/281.1 |
| 5,266,447 A * | 11/1993 | Takahashi et al. | 430/345 |
| 5,289,547 A | 2/1994 | Ligas et al. | |
| 5,434,032 A * | 7/1995 | Robillard | 430/345 |
| 5,512,423 A * | 4/1996 | Kitao et al. | 430/345 |
| 5,691,757 A | 11/1997 | Hayashihara et al. | |
| 5,800,950 A | 9/1998 | Hirao et al. | |
| 5,876,898 A * | 3/1999 | Ikeda et al. | 430/203 |
| 6,329,035 B1 | 12/2001 | Iwasaki et al. | |
| 6,342,335 B1 | 1/2002 | Fujita et al. | |
| 6,416,922 B2 | 7/2002 | Sato et al. | |
| 6,432,876 B1 * | 8/2002 | Obayashi et al. | 503/218 |
| 6,447,979 B1 | 9/2002 | Hattori et al. | |
| 6,551,710 B1 | 4/2003 | Chen et al. | |
| 2003/0068575 A1 * | 4/2003 | Yanaka | 430/270.1 |
| 2004/0146812 A1 | 7/2004 | Gore et al. | |
| 2004/0213922 A1 | 10/2004 | Abrams et al. | |

FOREIGN PATENT DOCUMENTS

| | | |
|---|---|---|
| DE | 69606807 T2 | 7/2000 |
| JP | 63-209885 A | 12/1988 |
| JP | 2000-226528 A | 8/2000 |
| WO | WO2004/067289 | 8/2004 |

OTHER PUBLICATIONS

Suzuki, Takayuki, Fu-Tyan Lin, Satyam Priyadashy and Stephen G. Weber, "Stabilization of the mercocyanine form of photochromic compounds in fluoro alcohols is due to a hydrogen bond," Chem. Commun., 1998, 2685-2686.

Nakabayashi, Takakazu, Nobuyuki Nishi and Hlrochika Sakuragi, "Photochemistry of photochromic benzopyrans studied by time-resolved absorption spectroscopy," Science Progress (2001), 84 (2), 137-156.

German Patent Office, Office Action (translated into English), May 5, 2010, 2 pages.

* cited by examiner

*Primary Examiner* — John Chu

(57) ABSTRACT

Compositions and methods for production of color images which are developable at desired wavelengths are disclosed and described. The color forming composition can include a color former which is a spiro dye. The color forming composition can include a radiation antenna admixed with or in thermal contact with the color former. The color forming composition can also be optimized for development using electromagnetic radiation having a selected development wavelength. The color forming compositions are useful in forming images on a wide variety of substrates such as optical disks.

23 Claims, No Drawings

COLOR FORMING COMPOSITIONS AND ASSOCIATED METHODS

FIELD OF THE INVENTION

The present invention relates generally to color forming compositions. More particularly, the present invention relates to methods and compositions which rapidly form color images using Spiro dyes.

BACKGROUND OF THE INVENTION

Compositions which produce a color change upon exposure to energy in the form of light or heat are of great interest in producing images on a variety of substrates. As an example, optical disks represent a significant percentage of the market for data storage of software as well as of photographic, video, and/or audio data. Typically, optical disks have data patterns embedded thereon that can be read from and/or written to one side of the disk, and a graphic display or label printed on the other side of the disk.

In order to identify the contents of the optical disk, printed patterns or graphic display information can be provided on the non-data, or label, side of the disk. The patterns or graphic display can be both decorative and provide pertinent information about the data content of the disk. In the past, commercial labeling has been routinely accomplished using screen-printing methods. While this method can provide a wide variety of label content, it tends to be cost ineffective for production of less than about 400 customized disks because of the fixed costs associated with preparing a stencil or combination of stencils and printing the desired pattern or graphic display.

In recent years, the significant increase in the use of optical disks for data storage by consumers has increased the demand to provide customized labels to reflect the content of the optical disk. Most consumer available methods of labeling are limited to either handwritten descriptions which lack professional appearance, quality and variety, or preprinted labels which may be affixed to the disk, but which can also adversely affect the disk performance upon spinning at high speeds.

A number of materials which can produce a color change upon exposure to energy are known. For example, such color forming materials are used in thermal printing papers, instant imaging films, and the like. These materials typically use a multi-layered composite structure and often additional processing steps. Most often, these technologies can require relatively high heat flux over somewhat long periods of time. For example, some of these methods utilize carbon dioxide lasers having energy densities of 3 $J/cm^2$ or more for exposure times of greater than about 100 μsec. Therefore, there are limitations as to the types of materials which can be used as a substrate and the marking speeds.

Recently, color forming compositions have been developed which can be developed using energy sources such as lasers in order to form an image with improved marking speeds and reduced heat flux requirements. However, there is a need for compositions with desirable attributes such as even faster developing speeds, increased flexibility for color palette, and variety in color forming processes. For these and other reasons, the need still exists for color forming compositions which increase the available options for such imaging systems.

SUMMARY OF THE INVENTION

It has been recognized that it would be advantageous to provide rapidly developable color forming compositions which are developable at various wavelengths. In one aspect of the present invention, a color forming composition can include a color former which is a spiro dye. A radiation antenna can also be admixed with or in thermal contact with the color former. Typically, the color forming composition can also be optimized for development using electromagnetic radiation having a desired development wavelength.

A system for developing such color forming compositions can include a substrate having the color forming composition thereon. As part of this system, an image data source can be used to selectively direct electromagnetic radiation from an electromagnetic radiation source. The color forming composition and electromagnetic radiation source can be configured to sufficiently heat the color forming composition to develop the color former.

Additional aspects and advantages of the invention will be apparent from the detailed description which follows.

DETAILED DESCRIPTION OF THE PREFERRED EMBODIMENT(S)

Reference will now be made to exemplary embodiments and specific language will be used herein to describe the same. It will nevertheless be understood that no limitation of the scope of the invention is thereby intended. Alterations and further modifications of the inventive features described herein and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a radiation antenna" includes reference to one or more of such materials.

As used herein, the term "color forming composition" typically includes a color former, a radiation antenna, and an optional polymer matrix. These components can work together upon exposure to radiation to develop the color former to cause a change in color. For purposes of the present invention, the term "color" or "colored" can refer to change in visible absorbance that occurs upon development, including development to black, white, or traditional colors. An undeveloped color former can be colorless or may have some color which changes upon development to a different color.

As used herein, the term "color former" refers to any composition which changes color upon application of energy. Color formers of the present invention can typically include spiro dyes which are often colored in an open form and colorless in the closed form.

As used herein, "spiro dye" refers to a dye having a single atom common to two rings. The spiro dyes of the present invention can also be color formers.

As used herein, "developing," "development," or the like refers to an interaction or reaction which affects the color former to produce a visible change in color through a chemical reaction to the corresponding colored color former. Most often, the spiro dye color former can react in a photochromic reaction to form a colored open form (i.e. merocyanine form) of the spiro dye from the closed form. For example, 2H-benzopyrans typically react to cleave the bond between the spiro-carbon and the adjacent oxygen.

As used herein, "radiation antenna" refers generally to a radiation sensitive agent that can generate heat or otherwise transfer energy to surrounding molecules upon exposure to radiation at a specific wavelength. When admixed with or in thermal contact with a color former, a radiation antenna can be present in sufficient quantity so as to produce energy sufficient to at least partially develop the color former.

As used herein, "thermal contact" refers to the spatial relationship between an antenna and a color former. For example, when an antenna is energized by interaction with laser radiation, the energy generated by the antenna should be sufficient to cause the color former of the color forming composition to darken, change, or become colored, through a chemical reaction. Thermal contact can include close proximity between an antenna and a color former, which allows for energy transfer from the antenna toward the color former. Thermal contact can also include actual intimate contact between an antenna and color former, such as in immediately adjacent layers, or in an admixture including both constituents.

As used herein, the term "spin-coatable composition" includes a liquid carrier having various components dissolved or dispersed therein. In some embodiments, the spin-coatable composition can comprise a color former, uncured polymer matrix material, and a radiation antenna in a common liquid carrier. In other embodiments, fewer components can be present in a liquid carrier forming the spin-coatable composition. Color forming compositions can be spin-coatable in one embodiment, or can be configured for other application methods as well, e.g., printing such as offset, ink-jet, gravure, roller coating, screen printing, spraying, or other application methods known to those skilled in the art.

As used herein, "optimization" and "optimized" refer to a process of selection of components of the color forming composition which results in a rapidly developable composition under a fixed period of exposure to radiation at a specified power. For example, compositions of the present invention can be optimized for development using laser light of a specified wavelength in which the color forming composition exposed to the laser light is developed in less than a predetermined period of time, e.g., 5 ms to 100 μsec. However, "optimized" does not necessarily indicate that the color forming composition is developed most rapidly at a specific wavelength, but rather that the composition can be developed within a specified time frame using a given radiation source. An optimized composition would also indicate an ambient light stability over extended periods of time, i.e. several months to years. Thus, an optimized composition results from a combination of all components of the color forming composition in affecting development characteristics and stability.

As used herein, "optical disk" is meant to encompass audio, video, multi-media, and/or software disks that are machine readable in a CD and/or DVD drive, or the like. Examples of optical disk formats include writeable, recordable, and rewriteable disks such as DVD, DVD−R, DVD−RW, DVD+R, DVD+RW, DVD-RAM, CD, CD-ROM, CD-R, CD-RW, and the like. Other like formats may also be included, such as similar formats and formats to be developed in the future.

As used herein, "graphic display" can include any visible character or image found on a substrate, such as an optical disk. With optical disks, the graphic display is found prominently on one side of the optical disk, though this is not always the case.

As used herein, "data" is typically used with respect to the present disclosure to include the non-graphic information contained on the optical disk that is digitally or otherwise embedded therein. Data can include audio information, video information, photographic information, software information, and the like.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 μm to about 200 μm should be interpreted to include not only the explicitly recited limits of 1 μm to about 200 μm, but also to include individual sizes such as 2 μm, 3 μm, 4 μm, and sub-ranges such as 10 μm to 50 μm, 20 μm to 100 μm, etc.

In accordance with the present invention, a color forming composition can include a color former. The color former of the present invention can be a spiro dye. The color forming composition can further include a radiation antenna admixed with or in thermal contact with the color former. In addition, the color forming composition can also be optimized for development using electromagnetic radiation having a predetermined development wavelength, which depends on a particular application.

Upon application of suitable electromagnetic radiation, the radiation antenna and color former absorb enough energy to develop the color former. Specific color formers, radiation antennae, and other components of the color forming composition can each affect the development properties and long-term stability of the color forming composition and are discussed in more detail below.

Color Former

Color forming compositions of the present invention can include a color former which can be dispersed, e.g., or dissolved or mixed, within a polymer matrix. This can be accomplished by any known method such as mixing, rolling, milling, homogenization or the like. In most cases, it can be desirable to uniformly disperse the color former throughout the polymer matrix. Dispersing the color former within the polymer matrix allows for increased contact of the color former with antenna and/or other energy transfer materials, which are discussed below in more detail. Further, a dispersion of color former within the polymer matrix can be formed as a single composition, e.g., a paste, which can then be coated on a substrate in a single step. Typically, the color forming composition can be formed by heating the color former and radiation antenna to form a substantially homogeneous melt which can then be cooled. In this way, the radiation antenna can be uniformly mixed with the color former to improve marking speed and image quality. However, in some cases, the components can be mixed sufficiently without creating a melt. Processes that are commonly used for preparing intimate mixtures are ball milling, microfluidization, sonication, microwave processing, and high pressure homogenization using APV homogenization techniques as described in U.S. Pat. No. 5,976,232, which is incorporated by reference herein. Other methods include modifications of milling processes with improvements in conventional media mill designs such as those found in Netzsch LMC mills and Drais DCP mills. These mills have incorporated smaller screen opening dimensions that allow physical separation (e.g., filtration) of larger milling media from milled substrate particles as small as 250 to 300 micrometers or less and can used to prepare intimate mixtures for use in the present invention.

The amount of color former dispersed within the polymer matrix can vary considerably depending on the concentration and type of color former used, as well as a number of other factors such as desired development speed, desired color intensity of developed color former, and the like. However, as a general guideline, the color former can comprise from about 1 wt % to about 50 wt %. Although amounts outside this range can be successfully used, depending on the other components of the composition, amounts from about 5 wt % to about 30 wt % frequently provide adequate results. Alternatively, the color former and polymer matrix can be formed in adjacent separate layers.

In accordance with the present invention, the color former can be a spiro dye. Spiro dyes can be found having a general chemical substructure as shown in Formula I.

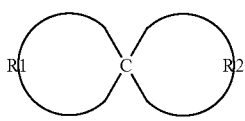

Formula I wherein R1 and R2 can provide the balance of any number of monocyclic, polycyclic, heterocyclic, aromatic, or other similar groups. These R1 and R2 groups can further include substituent groups such as alkyl, aryl, alkyloxy, nitro, fluoro, bromo, chloro groups. Spiro dyes typically exist in either the closed form, as shown in Formula I, or in an opened form wherein at least one bond between the central spiro-carbon is eliminated, as shown in Formula II below. The transformation from the closed to open form can be accomplished by the addition of light and/or heat. Typically, this transformation is not only relatively slow when energy is applied, but it is often reversible such that upon removal of the light, or exposure of another wavelength of light or other energy source, or exposure to heat or light, the spiro dye can reassume the initial structure. This can be undesirable for marking applications which require predictable and long life times. Thus, in accordance with the present invention, additional components can be added, as discussed below, in order to produce a fast marking composition with an acceptable degree of light stability over time.

Non-limiting examples of suitable spiro dyes are described in "Organic Photo Chromic and Thermochromic Compounds" Volume 1, Crano, J. C.; Guglielmetti, R. J., Eds., 1999, Plenum Press, New York, ISBN 0-306-45882-9; "Organic Photo Chromic and Thermochromic Compounds" Volume 2, Crano, J. C.; Guglielmetti, Eds., 1999, Kluwer Academic/Plenum Publishers, NewYork, ISBN 0-306-45883-7; and "Photochromism, Molecules and Systems" Pages 314-466, Durr, H.; Bouas Laurent, H., Eds., 2003, Elsevier Science, Amsterdam The Netherlands, ISBN 0-444-51322-1, each of which is incorporated herein by reference. The described color formers include compounds containing substructures such as spiropyran (Formula III), spirooxazine (Formula IV), spirobenzopyran, spiroindolinobenzopyran, spirobenzopyranobenzopyran, spironaphthoxazine (Formula V), spirothiopyran, spirobenzopyranopyran (Formula VI), spirobenzothiozaline (Formula VII), and combinations thereof. Some of these dyes may be part of polymeric structures. An example of the color forming reaction is illustrated in Formula II. The R1-R6 groups represent nitro, alkoxy, alkyl, aryl, chains and rings of aromatic and heteroaromatic mono or polycyclic structure features, or halogens, examples of which appear in the references cited above.

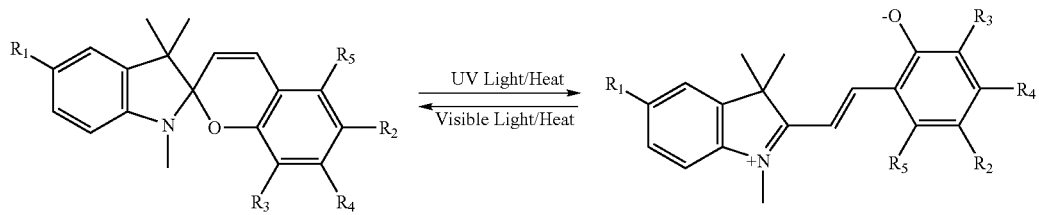

Formula II

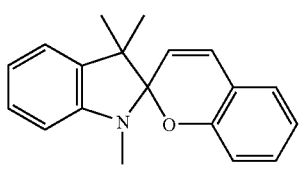

Formula III

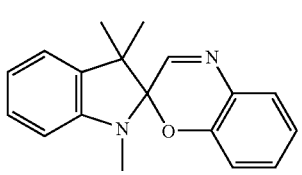

Formula IV

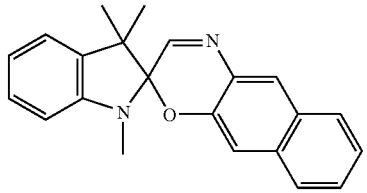

Formula V

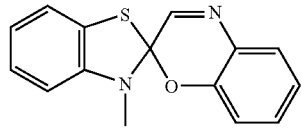

Formula VI

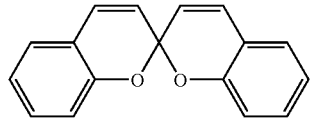

Formula VII

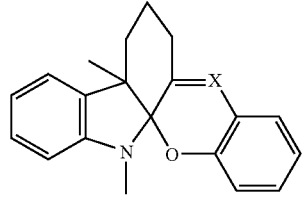

Formula VIII

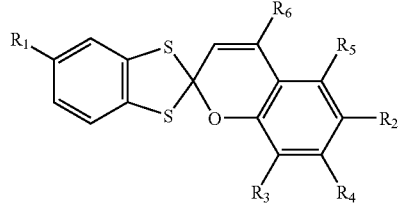

Formula IX

Many of these materials are available commercially from PPG Industries, Pittsburgh, Pa. under the name Photosol, from James Robinson, Huddersfield West Yorkshire, UK, under the name Reversacol photochromic dyes; and from Aldrich chemical company Milwaukee, Wis.

Radiation Antennae

A radiation antenna that acts as an efficient energy absorber, can be included in the color forming composition as a component which can be used to optimize development of the color forming composition upon exposure to radiation at a predetermined exposure time and/or wavelength. The radiation antenna can act as an energy antenna, providing energy to surrounding areas upon interaction with an energy source. As a predetermined amount of energy can be provided by the radiation antenna, matching of the radiation wavelength and intensity to the particular antenna used can be carried out to optimize the system within a desired optimal range. Most common commercial applications can require optimization to a development wavelength of about 200 nm to about 1200 nm, although wavelengths outside this range can be used by adjusting the radiation antenna and color forming composition accordingly. Several common development wavelengths can include 405 nm, 650 nm, 780 nm, and 1084 nm.

Suitable radiation antenna can be selected from a number of radiation absorbers such as, but not limited to, aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogeno-pyryloarylidene dyes, indolizine dyes, pyrylium dyes, quinoid dyes, quinone dyes, azo dyes, and mixtures or derivatives thereof. Other suitable antennas can also be used in the present invention and are known to those skilled in the art and can be found in such references as "Infrared Absorbing Dyes", Matsuoka, Masaru, ed., Plenum Press, New York, 1990 (ISBN 0-306-43478-4) and "Near-infrared Dyes for High Technology Applications", Daehne, Resch-Genger, Wolfbeis, Kluwer Academic Publishers (ISBN 0-7923-5101-0), both incorporated herein by reference.

Various radiation antennas can act as an antenna to absorb electromagnetic radiation of specific wavelengths and ranges. Generally, a radiation antenna which has a maximum light absorption at or in the vicinity of the desired development wavelength can be suitable for use in the present invention. For example, in one aspect of the present invention, the color forming composition can be optimized within a range for development using infrared radiation having a wavelength from about 720 nm to about 900 nm. Common CD-burning lasers have a wavelength of about 780 nm and can be adapted for forming images by selectively developing portions of the color forming composition. Radiation antennae which can be suitable for use in the infrared range can include, but are not limited to, polymethyl indoliums, metal complex IR dyes, indocyanine green, polymethine dyes such as pyrimidinetrione-cyclopentylidenes, guaiazulenyl dyes, croconium dyes, cyanine dyes, squarylium dyes, chalcogenopyryloarylidene dyes, metal thiolate complex dyes, bis(chalcogenopyrylo) polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, hexafunctional polyester oligomers, heterocyclic compounds, and combinations thereof.

Several specific polymethyl indolium compounds are available from Aldrich Chemical Company and include 2-[2-[2-chloro-3-[2-(1,3-dihydro-1,3,3-trimethyl-2H-indol-2-ylidene)-ethylidene]-1-cyclopenten-1-yl-ethenyl]-1,3,3-trimethyl-3H-indolium perchlorate; 2-[2-[2-Chloro-3-[2-(1,3-dihydro-1,3,3-trimethyl-2H-indol-2-ylidene)-ethylidene]-1-cyclopenten-1-yl-ethenyl]-1,3,3-trimethyl-3H-indolium chloride; 2-[2-[2-chloro-3-[(1,3-dihydro-3,3-dimethyl-1-propyl-2H-indol-2-ylidene)ethylidene]-1-cyclohexen-1-yl] ethenyl]-3,3-dimethyl-1-propylindolium iodide; 2-[2-[2-chloro-3-[(1,3-dihydro-1,3,3-trimethyl-2H-indol-2-ylidene) ethylidene]-1-cyclohexen-1-yl]ethenyl]-1,3,3-trimethylindolium iodide; 2-[2-[2-chloro-3-[(1,3-dihydro-1, 3,3-trimethyl-2H-indol-2-ylidene)ethylidene]-1-cyclohexen-1-yl]ethenyl]-1,3,3-trimethylindolium perchlorate; 2-[2-[3-[(1,3-dihydro-3,3-dimethyl-1-propyl-2H-indol-2-ylidene)ethylidene]-2-(phenylthio)-1-cyclohexen-1-yl]ethenyl]-3,3-dimethyl-1-propylindolium perchlorate; and mixtures thereof. Alternatively, the radiation antenna can be an inorganic compound, e.g., ferric oxide, carbon black, selenium, or the like. Polymethine dyes or derivatives thereof such as a pyrimidinetrione-cyclopentylidene, squarylium dyes such as guaiazulenyl dyes, croconium dyes, or mixtures thereof can also be used in the present invention. Suitable pyrimidinetrione-cyclopentylidene infrared antennae include, for example, 2,4,6(1H,3H,5H)-pyrimidinetrione 5-[2,5-bis[(1,3-dihydro-1,1,3-dimethyl-2H-indol-2-ylidene)ethylidene]cyclopentylidene]-1,3-dimethyl-(9Cl) (S0322 available from Few Chemicals, Germany).

In another aspect of the present invention, the radiation antenna can be selected for optimization of the color forming composition in a wavelength range from about 600 nm to about 720 nm, such as about 650 nm. Non-limiting examples of suitable radiation antennae for use in this range of wavelengths can include indocyanine dyes such as 3H-indolium, 2-[5-(1,3-dihydro-3,3-dimethyl-1-propyl-2H-indol-2-ylidene)-1,3-pentadienyl]-3,3-dimethyl-1-propyl-,iodide) (Dye 724 $\lambda$max 642 nm), 3H-indolium, 1-butyl-2-[5-(1-butyl-1,3-dihydro-3,3-dimethyl-2H-indol-2-ylidene)-1,3-pentadienyl]-3,3-dimethyl-,perchlorate (Dye 683 $\lambda$max 642 nm), and phenoxazine derivatives such as phenoxazin-5-ium,3,7-bis(diethylamino)-,perchlorate (oxazine 1 $\lambda$max=645 nm). Phthalocyanine dyes having a $\lambda$max of about the desired development wavelength can also be used such as silicon 2,3-napthalocyanine bis(trihexylsilyloxide) and matrix soluble derivatives of 2,3-napthalocyanine (both commercially available from Aldrich Chemical); matrix soluble derivatives of silicon phthalocyanine (as described in Rodgers, A. J. et al., 107 J. Phys. Chem. A 3503-3514, May 8, 2003), and matrix soluble derivatives of benzophthalocyanines (as described in Aoudia, Mohamed, 119 J. Am. Chem. Soc. 6029-6039, Jul. 2, 1997); phthalocyanine compounds such as those described in U.S. Pat. Nos. 6,015,896 and 6,025,486, which are each incorporated herein by reference; and Cirrus 715 (a phthalocyanine dye available from Avecia, Manchester, England having a $\lambda$max=806 nm).

In yet another aspect of the present invention, laser light having blue and indigo wavelengths from about 300 nm to about 600 nm can be used to develop the color forming compositions. Therefore, the present invention can provide color forming compositions optimized within a range for use in devices that emit wavelengths within this range. Recently developed commercial lasers found in certain DVD and laser disk recording equipment provide for energy at a wavelength of about 405 nm. Thus, the compositions of the present invention using appropriate radiation antennae can be suited for use with components that are already available on the market or are readily modified to accomplish imaging. Radiation antennae which can be useful for optimization in the blue (~405 nm) and indigo wavelengths can include, but are not limited to, aluminum quinoline complexes, porphyrins, porphins, and mixtures or derivatives thereof. Non-limiting specific examples of suitable radiation antenna can include 1-(2-chloro-5-sulfophenyl)-3-methyl-4-(4-sulfophenyl)azo-2-pyrazolin-5-one disodium salt ($\lambda$max=400 nm); ethyl 7-diethylaminocoumarin-3-carboxylate ($\lambda$max=418 nm); 3,3'-diethylthiacyanine ethylsulfate ($\lambda$max=424 nm); 3-allyl-5-(3-ethyl-4-methyl-2-thiazolinylidene) rhodanine ($\lambda$max=430 nm) (each available from Organica Feinchemie GmbH Wolfen), and mixtures thereof. Non-limiting specific examples of suitable aluminum quinoline complexes can include tris(8-hydroxyquinolinato)aluminum (CAS 2085-33-8) and derivatives such as tris(5-cholor-8-hydroxyquinolinato)aluminum (CAS 4154-66-1), 2-(4-(1-methyl-ethyl)-phenyl)-6-phenyl-4H-thiopyran-4-ylidene)-propanedinitril-1,1-dioxide (CAS 174493-15-3), 4,4'-[1,4-phenylenebis(1,3,4-oxadiazole-5,2-diyl)]bis N,N-diphenyl benzeneamine (CAS 184101-38-0), bis-tetraethylammonium-bis(1,2-dicyano-dithiolto)-zinc(II) (CAS 21312-70-9), 2-(4,5-dihydronaphtho[1,2-d]-1,3-dithiol-2-ylidene)-4,5-dihydro-naphtho[1,2-d]1,3-dithiole, all available from Syntec GmbH. Non-limiting examples of specific porphyrin and porphyrin derivatives can include etioporphyrin 1 (CAS 448-71-5), deuteroporphyrin IX 2,4bis ethylene glycol (D630-9) available from Frontier Scientific, and octaethyl porphrin (CAS 2683-82-1), azo dyes such as Mordant Orange (CAS 2243-76-7), Merthyl Yellow (CAS 60-11-7), 4-phenylazoaniline (CAS 60-09-3), Alcian Yellow (CAS 61968-76-1), available from Aldrich chemical company, and mixtures thereof.

Regardless of the specific development wavelengths, the radiation antenna can be configured to be in a heat-conductive relationship with the color formers of the present invention. For example, the radiation antenna can be mixed within the color former, the polymer matrix, and/or a separate layer. Thus, the radiation antenna can be admixed with or in thermal contact with the color former. Typically, the radiation antenna can be present in both the color former and the polymer matrix. In this way, substantially the entire color forming composition in an exposed area can be heated quickly and substantially simultaneously. This is also beneficial when an activator is included in the polymer matrix. Alternatively, the radiation antenna can be applied as a separate layer which can be optionally spin-coatable or screen-printable.

In formulating the color forming composition of the present invention, an optimized composition can depend on a variety of factors, since each component can affect the development properties, e.g., time, color intensity, etc. For example, a color forming composition having a radiation antenna with a maximum absorption of about 780 nm may not develop most rapidly at 780 nm. Other components and the specific formulation can result in an optimized composition at a wavelength which does not correspond to the maximum absorption of the radiation antenna. Thus, the process of formulating an optimized color forming composition includes testing formulations to achieve a desired development time using a specific intensity and wavelength of energy to form an acceptable color change.

Consideration can also be given to choosing the radiation antenna such that any light absorbed in the visible range does not adversely affect the graphic display or appearance of the color forming composition either before or after development. For example, in order to achieve a visible contrast between developed areas and non-imaged or non-developed areas of the coating, the color former can be chosen to form a color that is different than that of the background. For example, color formers having a developed color such as black, blue, red, magenta, and the like can provide a good contrast to a more yellow background. Optionally, an additional non-color former colorant can be added to the color forming compositions of the present invention or the substrate on which the color forming composition is placed. Any known non-color former colorant can be used to achieve almost any desired background color for a given commercial product. Although the specific color formers and antennae discussed herein are typically separate compounds, such activity can also be provided by constituent groups of a binder and/or color former which is incorporated in the activation and/or radiation absorbing action within the color former and is considered within the scope of the present invention. Generally, the radiation antenna can be present in the color forming composition in an amount of from about 0.001 wt % to about 10 wt %, and typically, from about 0.5 wt % to about 1 wt %, although other weight ranges may be desirable depending on the molar absorbtivity of the particular antenna.

Stabilizer

In accordance with the present invention, the color forming compositions can further include a developer or a stabilizer. Without subscribing to a particular theory, the developer can be capable of developing a color change in a reaction with the color former. The stabilizer can be capable of stabilization of the color former in a developed state and/or act as an activator to facilitate development of the color former. In many cases a single component may perform both functions. Specifically, in some embodiments of the present invention, the spiro dyes are no longer photochromic, e.g., at least partially due to the dispersion in a UV or polymer matrix and/or the accompanying radiation antenna. Suitable stabilizers can include any agent which is capable of facilitating development of the color former and/or preventing the color former from reverting to the closed, or undeveloped, form. Non-limiting examples of suitable stabilizers can include zinc salts such as zinc stearate, zinc hexanoate, zinc salicylate, zinc acetate, carboxylates such as calcium monobutylphthalate and calcium resimate (CAS 9007-13-0), phenolic compounds such as bisphenol-A, sulfonyl diphenol, TG-SA, and zinc or calcium salts thereof. As a general guideline, the color forming compositions of the present invention can include from about 5 wt % to about 40 wt % developer/stabilizer. Preferably, about 10 wt % to about 20 wt % of the total composition comprises a stabilizer.

Polymer Matrix

The color forming compositions of the present invention can typically include a polymer matrix which acts primarily as a binder. As mentioned above, the color former phase can be dispersed within the polymer matrix. Various polymer matrix materials can influence the development properties of the color forming composition such as development speed, light stability, and wavelengths which can be used to develop the composition. Acceptable polymer matrix materials can also include, by way of example, UV curable polymers such as acrylate derivatives, oligomers, and monomers, such as included as part of a photo package. A photo package can include a light absorbing species which initiates reactions for curing of a lacquer. Such light absorbing species can be sensitized for curing using UV or electron beam curing systems, such as, by way of example, benzophenone derivatives. Other examples of photoinitiators for free radical polymerization monomers and pre-polymers can include, but are not limited to, thioxanethone derivatives, anthraquinone derivatives, acetophenones, and benzoine ethers. Additional examples of matrix materials, prepared and coated as dispersions in water or solvents, solutions, solid melts include polyvinyl alcohol, polyvinyl chloride, polyvinyl butyral, cellulose esters and blends such as cellulose acetate butyrate, polymers of styrene, butadiene, ethylene, poly carbonates, polymers of vinyl carbonates such as CR39, available from PPG industries, Pittsburgh, and co-polymers of acrylic and allyl carbonate momoners such as BX-946, available form Hampford Research, Stratford, Conn. These components can be dissolved, dispersed, ground and deposited in these matrices, and the films can be formed using commonly known processes such as solvent or carrier evaporation, vacuum heat, drying and processing using light.

In particular embodiments of the invention, it can be desirable to choose a polymer matrix which is cured by a form of radiation that does not also develop the color former or otherwise decrease the stability of the color forming composition at the energy input and flux necessary to cure the coatings. Thus, the polymer matrix can be curable at a curing wavelength which is substantially different than the development wavelength.

Further, a suitable photoinitiator should also have light absorption band which is not obscured by the absorption band of the radiation antenna, otherwise the radiation antenna can interfere with photoinitiator activation and thus prevent cure of the coating. However, in practice the absorption bands of the photoinitiator and radiation antennae can overlap. In such cases, a working system design is possible because the energy flux required for development of a color former is about ten times higher than needed for initiation of the cure. In yet another embodiment, the radiation antenna has a duel function; one of sensitization of cure for UV cure under cure conditions (relatively low energy flux), and provides for energy for marking during development. Polymer matrix materials based on cationic polymerization resins can include photo-initiators based on acyloin compounds, aromatic diazonium salts, aromatic halonium salts, aromatic sulfonium salts, phosphine oxide, amine-ketone class, and metallocene compounds. Many of these are available as IRGACURE and DAROCURE materials from Ciba-Giegy, and included by reference. Additional components such as sensitizers, additional photoinitiators, or the like can also be used in accordance with principles known to those skilled in the art.

Additionally, binders can be included as part of the polymer matrix. Suitable binders can include, but are not limited to, polymeric materials such as polyacrylate from monomers and oligomers, polyvinyl alcohols, polyvinyl pyrrolidines, polyethylenes, polyphenols or polyphenolic esters, polyurethanes, acrylic polymers, and mixtures thereof. For example, the following binders can be used in the color forming composition of the present invention: cellulose acetate butyrate, ethyl acetate butyrate, polymethyl methacrylate, polyvinyl butyral, and mixtures thereof.

Other Optional Ingredients

The color forming compositions of the present invention can also include various additional components such as surfactants, colorants, liquid vehicles, stabilizers, UV absorbers, anti-fade agents, plasticizers, leuco dyes, non-color former dyes, and other additives known to those skilled in the art.

In one optional embodiment, color formers which are leuco dyes (i.e. not spiro dyes) can be used. Suitable leuco dyes can include, but are not limited to, fluorans, phthalides, aminotriarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids (cyanoethanes, leuco methines) and corresponding esters, 2(phydroxyphenyl)-4,5-diphenylimidazoles, indanones, leuco indamines, hydrozines, leuco indigoid dyes, amino-2,3-dihydroanthraquinones, tetrahalo-p,p'-biphenols, 2(phydroxyphenyl)-4,5-diphenylimidazoles, phenethylanilines, phthalocyanine precursors (such as those available from Sitaram Chemicals, India), and mixtures thereof. Other leuco dyes can also be used in connection with the present invention and are known to those skilled in the art. A more detailed discussion of some of these types of leuco dyes can be found in U.S. Pat. Nos. 3,658,543 and 6,251,571, each of which are hereby incorporated by reference in their entireties. Examples are found in *Chemistry and Applications of Leuco Dyes*, Muthyala, Ramaiha, ed.; Plenum Press, New York, London; ISBN: 0-306-45459-9, incorporated herein by reference.

In order to reduce development times and increase sensitivity to an applied radiation source, the color forming composition can further include a melting aid. Suitable melting aids can have a melting temperature from about 50° C. to about 150° C. and often from about 70° C. to about 120° C. Melting aids are typically crystalline organic solids which can be melted and mixed with a particular color former. For example, most color formers are also available as a solid particulate which is soluble in standard liquid solvents. Thus, the color former and melting aid can be mixed and heated to form a molten mixture. Upon cooling, a color former phase of color former and melting aid is formed which can then be ground into a powder. In some embodiments of the present invention, the percent of color former and melting aid can be adjusted to minimize the melting temperature of the color former phase without interfering with the development properties of the color former. When used, the melting aid can comprise from about 5 wt % to about 25 wt % of the color former phase.

A number of melting aids can be effectively used in the color forming compositions of the present invention. Several non-limiting examples of suitable melting aids include m-terphenyl, p-benzyl biphenyl, alpha-napthyl benzylether, 1,2-bis(3,4)dimethylphenyl ethane, and mixtures thereof. Suitable melting aids can also include aromatic hydrocarbons (or their derivatives) which provide good solvent characteristics with the color former and radiation antennae used in the formulations and methods of the present invention. In general, any material having a high solubility and/or miscibility with the color former to form a glass or co-crystalline phase with the dye, and alters the melting property of the dye is useful in this process. For example, aromatic hydrocarbons, phenolic ethers, aromatic acid-esters, long chain (C6 or greater) fatty acid esters, polyethylene wax, or the like can also be suitable melting aids.

In certain embodiments of the present invention, it is sometimes desirable to add a plasticizer to improve coating flexibility, durability, and coating performance. Plasticizers can be either solid or liquid plasticizers. Such suitable plasticizers are well known to those skilled in the art, as exemplified in U.S. Pat. No. 3,658,543, which is incorporated herein by reference in its entirety. The plasticizer can be included in either or both of the polymer matrix and the color former phase.

Other additives can also be utilized for producing particular commercial products such as including a colorant to impart additional desired color to the image. The colorants can be color formers which are developed at wavelengths outside the development wavelength range or non-leuco colorants which can provide a background color. In one embodiment, optional colorants can be standard pigments and/or dyes. For example, the use of an opacifier pigment or other colorant can provide background color to the substrate. The optional colorants can be added to the color forming composition, underprinted, or overprinted, as long as the development of the color former is not prevented from at least some development due to the presence of the optional colorant.

In one embodiment, the color forming composition can be prepared in a solution which is substantially transparent or translucent. Any suitable liquid carrier, e.g., an alcohol with a surfactant, can be used which is compatible with a particular color former, polymer matrix, and/or other components chosen for use. The liquid carrier can include, but is not limited to, solvents such as methylethyl ketone, isopropyl alcohol or other alcohols and diols, water, surfactants, and mixtures thereof. When the color forming composition is prepared in a solution form, it may be desirable to underprint a colored coating over at least a portion of the substrate beneath the color forming composition. The optional colored coating produces a background color that can be visible underneath the solution layer. This colored coating can contain various colorants such as other pigments and/or dyes. In another embodiment, the coatings can contain opacifying agents such as titanium dioxide, zinc oxide, calcium oxide and polymeric pigments.

The color forming composition can be prepared in a number of ways for application to a substrate. Often, the liquid carrier can be used which can be at least partially removed through known solvent removal processes. Typically, at least a portion of the liquid carrier can be driven off or allowed to evaporate after the coating process is complete. Further, various additional components, such as lubricants, surfactants, and materials imparting moisture resistance, can also be added to provide mechanical protection to the color forming composition. Other overcoat compositions can also be used and are well known to those skilled in the art.

In one aspect of the present invention, the color forming composition can be spin-coatable. In order to provide desirable color forming properties and spin-coatability, various factors such as viscosity and solids content, particle size can also be considered. The color forming compositions of the present invention can have less than about 10 wt % of solids, which typically provides good coating properties. For example, in one aspect, the solids content of a spin-coatable color forming composition can be from about 5 wt % to about 9 wt %.

Radiation Application for Development

In one embodiment of the present invention, the color forming composition can be applied to a substrate. The composition can be applied to the substrate using any known technique such as spin-coating, screen printing, sputtering, spray coating, ink-jetting, or the like. A variety of substrates can be used such as an optical disk, polymeric surface, glass, ceramic, metal, or paper. In one embodiment, the color forming composition can be applied to an optical disk and select portions thereof developed using a laser or other radiation source.

Once the color forming composition is applied to the substrate, the conditions under which the color forming compositions of the present invention are developed can be varied. For example, one can vary the electromagnetic radiation wavelength, heat flux, and exposure time. The amount of energy which is to be applied depends partially on the activation energy of the development reaction of the color former and the specific radiation antenna chosen. However, the energy applied is typically sufficient to develop the color former without also decomposing the color forming composition or damaging the substrate. Such an energy level is typically well below the energy required for decomposition of the color forming composition. Variables such as spot size, focus, and laser power will also affect any particular system design and can be chosen based on the desired results. With these variables fixed at predetermined values, the radiation source can then direct electromagnetic radiation to the color forming composition in accordance with data received from a signal processor. Further, color former and/or radiation antenna concentration and proximity to one another can also be varied to affect the development times and the optical density of the developed image.

Typically, an image to be formed on the surface can be digitally stored and then rasterized or spiralized. The resulting data can be delivered to a radiation source which exposes portions of the color forming composition to radiation while the optical disk is spinning. Any number of electromagnetic radiation sources can be used. Lasers provide a simple and effective way of delivering focused and highly controlled pulsed light at almost any desired wavelength.

The color forming compositions of the present invention can be developed using lasers having from about 15 to 100 mW power output, although lasers having a power outside this range can also be used. Typically, lasers having from about 30 mW to about 50 mW are readily commercially available and work well using the color forming composition described herein. The spot size generated by the laser can be determined by radiation that contacts the substrate at a single point in time. The spot size can be circular, oblong, or other geometric shape, and can range from about 1 µm to about 200 µm along a largest dimension and often from about 10 µm to about 60 µm, though smaller or larger sizes can also be used.

Heat flux is a variable that can be altered as well, and can be from about 0.05 to 5.0 J/cm$^2$ in one embodiment, and from about 0.3 to 0.5 J/cm$^2$ in a second embodiment. In general, a heat flux of less than 3.0 J/cm$^2$ can be used, and frequently less than about 0.5 J/cm$^2$ can also be achieved with acceptable results. The color forming compositions of the present invention can be optimized by adjusting the concentrations and type of radiation antenna, color former, and polymer matrix. Based on the compositions of the present invention, a heat flux in the above ranges allow for development of color formers in optimized compositions in from about 10 µsec to about 100 µsec per dot in some embodiments. Further, the color forming compositions of the present invention can be optimized for development in less than about 1 millisecond, and in some embodiments less than about 500 µsec. In some embodiments, the color forming compositions of the present invention can be optimized for development in from about 100 µsec to about 500 µsec. Those skilled in the art can adjust these and other variables to achieve a variety of resolutions and developing times. In embodiments where the substrate is an optical disk or other moving substrate, the exposure time will depend on the rate of motion of the substrate. More specifically, in such embodiments, the exposure times above refer the time during which any given point on the substrate is exposed to the radiation. Thus, in accordance with the present invention, marking and development of the color forming compositions can be achieved directly, without the use of a printing intermediary or other additional steps.

The following example illustrates exemplary embodiments of the invention. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what is presently deemed to be practical embodiments of the invention.

EXAMPLE

Each of four spiro dyes: 6,8-dibromo-1'3-dhydro-1',3',3'-trimethylspiro[2H-1-benzopyran-2,2'-(2H)-indole (CAS 20200-62-8); 1,3'-Dihydro-1,3,3-trimethylspiro[2H-indole-2,3'-[3H]napth[2,1-b][1,4]oxazine] (CAS 27333-47-7); 1,3-dihydro-8-methoxy-1',3',3'-trimethyl-6-nitrospiro[2H-1-benzopyran-2',2'-(2H)-indol] (CAS 1498-89-1); And 1',3'-Dihydro-1',3',3'-trimenhyl-6-nitrospiro[2H-1-benzopyran-2'-2'-(2H)-indole (CAS 1498-88-0) were prepared in four separate color forming composition as described below. The spiro dye was finely ground using mortar and pastle and 0.3 gm of spiro dye was dispersed using a high shear mixer in 2.7 gm of a stock paste containing the developer/stabilizer zinc stearate, matrix (polyvinyl alcohol), absorber (indocyanine green), and a surfactant (Surfynol 465). The stock paste is prepared by using 97% hydrolyzed PVA (0.8 g), Surfynol 465 (0.2 g), Zn stearate (3.2 g) as a stabilizer, and 0.20 gm indocyanine green as the radiation absorber and blended in a Trolox high shear mixer at 15000 rpm for 30 min. The resulting paste mixture was screen printed on several optical disks at a thickness of about 5 µm to about 7 µm to form a color forming composition on the disks. The color forming composition was then dried and subsequently directly marked by a 35 mW 780 nm laser at exposure times from 0.1 milliseconds to 0.5 milliseconds. Excellent marking of was produced which exhibited good ambient and UV light stability.

It is to be understood that the above-referenced arrangements are illustrative of the application for the principles of the present invention. Numerous modifications and alternative arrangements can be devised without departing from the spirit and scope of the present invention while the present invention has been described above in connection with the exemplary embodiments(s) of the invention. It will be apparent to those of ordinary skill in the art that numerous modifications can be made without departing from the principles and concepts of the invention as set forth in the claims.

What is claimed is:

1. A color forming composition, comprising:
   a) a color former dispersed within a polymer matrix comprising a UV curable polymer, said color former being a spiro dye;
   b) a radiation antenna admixed with the color former; and
   c) a stabilizer capable of stabilization of the color former in a developed state, said color forming composition being coated on an optical disk.

2. The composition of claim 1, wherein the spiro dye is a member selected from the group consisting of spiropyran, spirobenzopyran, spiroindolinobenzopyran, spirobenzopyranobenzopyran, spironaphthoxazine, spirothiopyran, spirobenzopyranopyran, spirobenzothiolazine, perimidinespirocyclohexadienones, spiro[benzodithiolane]benzopyrnas, and combinations thereof.

3. The composition of claim 1, wherein the spiro dye is 6,8-dibromo-1'3-dhydro-1',3',3'-trimethylspiro[2H-1-benzopyran-2,2'-(2H)-indole.

4. The composition of claim 1, wherein the stabilizer is a member selected from the group consisting of zinc-based salts, carboxylates, phenolic compounds, calcium salts, and mixtures thereof.

5. The composition of claim 1, further comprising a melting aid, wherein the melting aid is capable of reducing development times and increasing sensitivity of the color former to an applied radiation source, and wherein the melting aid is an organic solid having a melting temperature from about 50° C. to about 150° C.

6. The composition of claim 5, wherein the melting aid comprises a member selected from the group consisting of aromatic hydrocarbons, phenolic ethers, aromatic acid-esters, long chain fatty acid esters with a carbon chain of 6 or greater, polyethylene wax, and derivatives thereof.

7. The composition of claim 1, said color forming composition being optimized for development using electromagnetic radiation having a development wavelength from about 200 nm to about 1200 nm.

8. The composition of claim 7, wherein the development wavelength is about 405 nm, 650 nm, 780 nm, or 1084 nm.

9. The composition of claim 1, wherein the radiation antenna is selected from the group consisting of aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogenopyryloarylidene dyes, indolizine dyes, pyrylium dyes, quinoid dyes, quinone dyes, azo dyes, and mixtures or derivatives thereof.

10. The composition of claim 1, wherein the color forming composition is optimized for development using radiation at less than about 0.5 J/cm$^2$.

11. The composition of claim 1, wherein the color forming composition is optimized for development in less than about 1 millisecond.

12. The composition of claim 1, wherein the color forming composition is spin-coatable.

13. A color forming composition, comprising:
   a) a color former, said color former being a spiro dye; and
   b) a radiation antenna admixed with the color former,
   wherein the color former and radiation antenna are present in an amount such that the color forming composition is optimized for development in less than about 1 millisecond using radiation at from about 0.3 J/cm$^2$ to less than 3.0 J/cm$^2$, and wherein the color forming composition is spin-coatable.

14. The composition of claim 13, wherein the spiro dye is a member selected from the group consisting of spiropyran, spirobenzopyran, spiroindolinobenzopyran, spirobenzopyranobenzopyran, spironaphthoxazine, spirothiopyran, spirobenzopyranopyran, spirobenzothiolazine, perimidinespirocyclohexadienones, spiro[benzodithiolane]benzopyrnas, and combinations thereof.

15. The composition of claim 13, wherein the spiro dye is 6,8-dibromo-1'3-dhydro-1',3',3'-trimethylspiro[2H-1-benzopyran-2,2'-(2H)-indole.

16. The composition of claim 13, further comprising a stabilizer capable of stabilization of the color former in a developed state.

17. The composition of claim 13, further comprising a melting aid, wherein the melting aid is capable of reducing development times and increasing sensitivity of the color former to an applied radiation source, and wherein the melting aid is an organic solid having a melting temperature from about 50° C. to about 150° C.

18. The composition of claim 13, said color forming composition being optimized for development using electromagnetic radiation having a development wavelength from about 200 nm to about 1200 nm.

19. The composition of claim 18, wherein the development wavelength is about 405 nm, 650 nm, 780 nm, or 1084 nm.

20. The composition of claim 13, wherein the radiation antenna is selected from the group consisting of aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogenopyryloarylidene dyes, indolizine dyes, pyrylium dyes, quinoid dyes, quinone dyes, azo dyes, and mixtures or derivatives thereof.

21. The composition of claim 13, wherein the color forming composition is optimized for development in about 100 μsec to about 500 μsec.

22. A color forming composition, comprising:
   a) a color former, said color former being 6,8-dibromo-1'3-dhydro-1',3',3'-trimethylspiro[2H-1-benzopyran-2,2'-(2H)-indole;
   b) a radiation antenna admixed with the color former; and
   c) a stabilizer capable of stabilization of the color former in a developed state,
   said color forming composition being coated on an optical disk.

23. A color forming composition, comprising:
   a) a color former, said color former being 6,8-dibromo-1'3-dhydro-1',3',3'-trimethylspiro[2H-1-benzopyran-2,2'-(2H)-indole; and
   b) a radiation antenna admixed with the color former,
   wherein the color former and radiation antenna are present in an amount such that the color forming composition is optimized for development in less than about 1 millisecond using radiation at from about 0.3 J/cm$^2$ to less than 3.0 J/cm$^2$.

* * * * *

UNITED STATES PATENT AND TRADEMARK OFFICE
CERTIFICATE OF CORRECTION

| | |
|---|---|
| PATENT NO. | : 8,076,058 B2 |
| APPLICATION NO. | : 10/956180 |
| DATED | : December 13, 2011 |
| INVENTOR(S) | : Makarand P. Gore |

It is certified that error appears in the above-identified patent and that said Letters Patent is hereby corrected as shown below:

In column 16, lines 63-64, in Claim 2, delete "benzopyrnas," and insert -- benzopyrans, --, therefor.

In column 16, line 66, in Claim 3, delete "dhydro" and insert -- dihydro --, therefor.

In column 18, lines 1-2, in Claim 14, delete "benzopyrnas," and insert -- benzopyrans, --, therefor.

In column 18, line 4, in Claim 15, delete "dhydro" and insert -- dihydro --, therefor.

In column 18, line 36, in Claim 22, delete "dhydro" and insert -- dihydro --, therefor.

In column 18, line 45, in Claim 23, delete "dhydro" and insert -- dihydro --, therefor.

Signed and Sealed this
Sixteenth Day of October, 2012

David J. Kappos
*Director of the United States Patent and Trademark Office*